Sept. 30, 1952 W. F. BISLEY 2,612,571
POWER UNIT AND GOVERNOR FOR HOUSEHOLD FOOD MIXER
Original Filed June 20, 1947 3 Sheets-Sheet 1

Inventor:
William F. Bisley.
By Watson D. Harbaugh
atty

Sept. 30, 1952 W. F. BISLEY 2,612,571
POWER UNIT AND GOVERNOR FOR HOUSEHOLD FOOD MIXER
Original Filed June 20, 1947 3 Sheets-Sheet 2
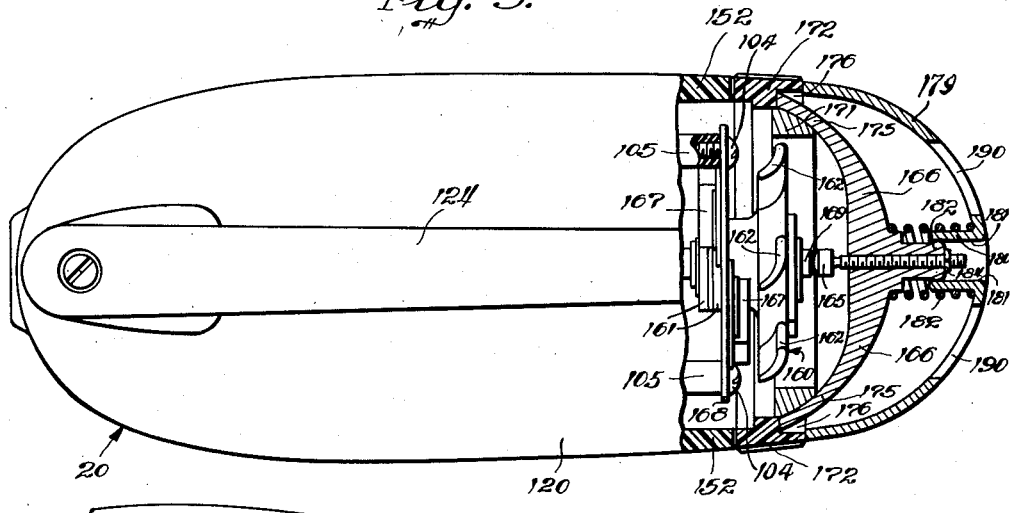
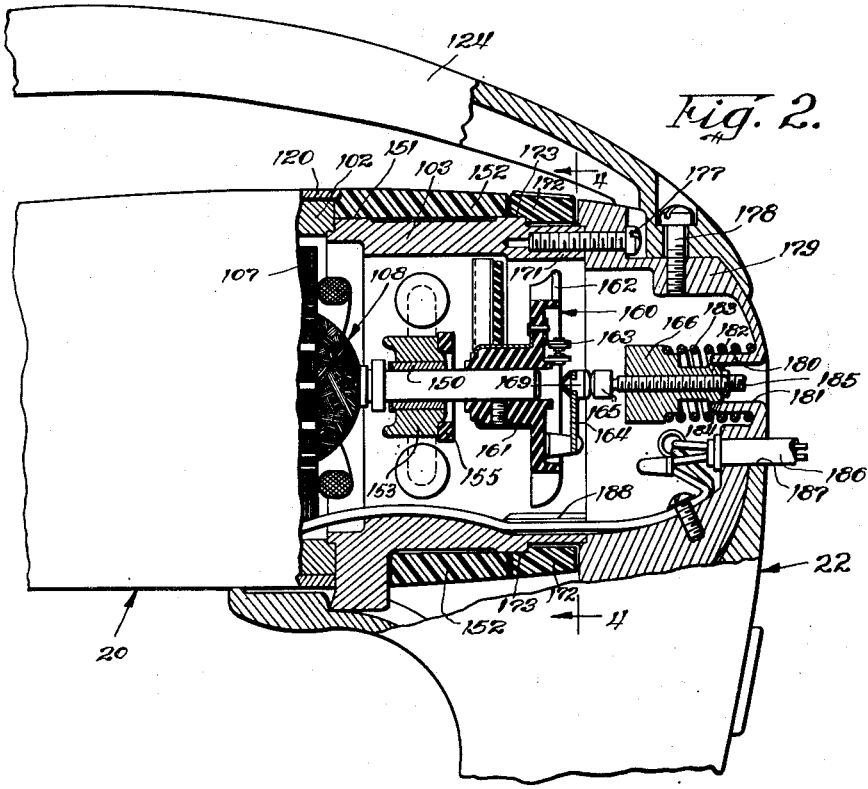
Inventor:
William F. Bisley.

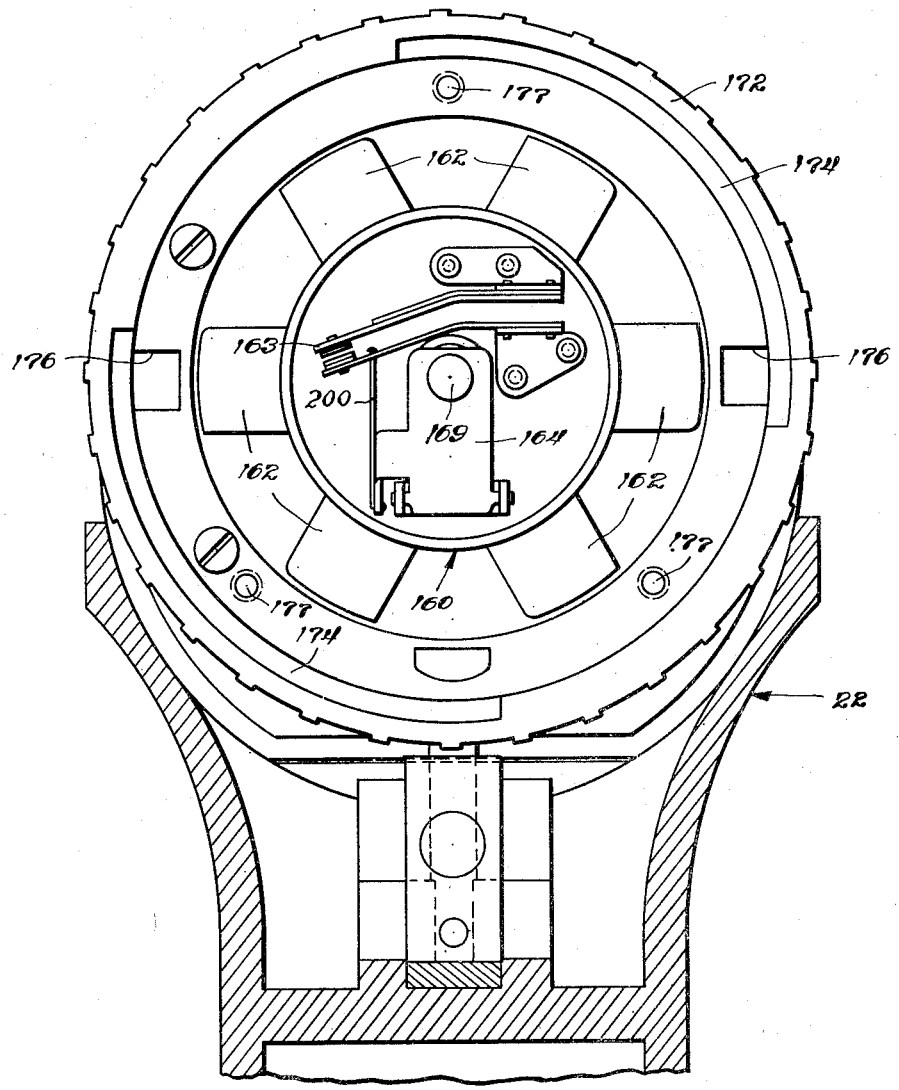

Patented Sept. 30, 1952

2,612,571

UNITED STATES PATENT OFFICE 2,612,571

POWER UNIT AND GOVERNOR FOR HOUSEHOLD FOOD MIXER

William F. Bisley, Oak Park, Ill.

Original application June 20, 1947, Serial No. 755,995. Divided and this application May 12, 1948, Serial No. 26,650

7 Claims. (Cl. 200—80)

The present invention relates to food mixers and more particularly to food mixers having interdigitating beaters depending from a power unit overhanging a bowl.

This application is a divison of application Serial No. 755,995, filed June 20, 1947.

The invention is further characterized by a manually operable speed control ring located where it can be managed and the power unit tilted by one hand with the above mentioned lateral push, whereby the motor speed can be reduced as the beaters come out of the mixture one at a time while the other hand remains free to manage the bowl or scraping utensils.

A further object of the invention is to provide a speed control for the food mixer which can be observed and managed from both sides of the power unit.

Another object of the invention is to provide an improved control for a rotary centrifugal responsive make-and-break speed governor which divides in a balanced way at widely spaced points the frictional load of its cam adjustment for ease of operation and assembly with no danger of creep from a set position existing during operating periods of the power unit.

The invention is further characterized by an arrangement of a cooling fan upon the rotary centrifugal speed governor which is shrouded by a manually actuated ring assembly which also controls the governor.

Other objects and advantages including ruggedness and ease of assembly and servicing will be apparent from the following description, the claims attached thereto, and the accompanying drawings, in which similar reference characters identify similar parts throughout the several views.

Referring to the drawings:

Fig. 2 is an enlarged vertical section taken on a plane passing through the axis of the motor drive showing the construction and arrangement of the elements of the power unit;

Fig. 3 is a top plan view partly in medial section of the power unit shown in Fig. 2; and Fig. 4 is a vertical section taken upon line 4—4 of Fig. 2.

Figure 1:
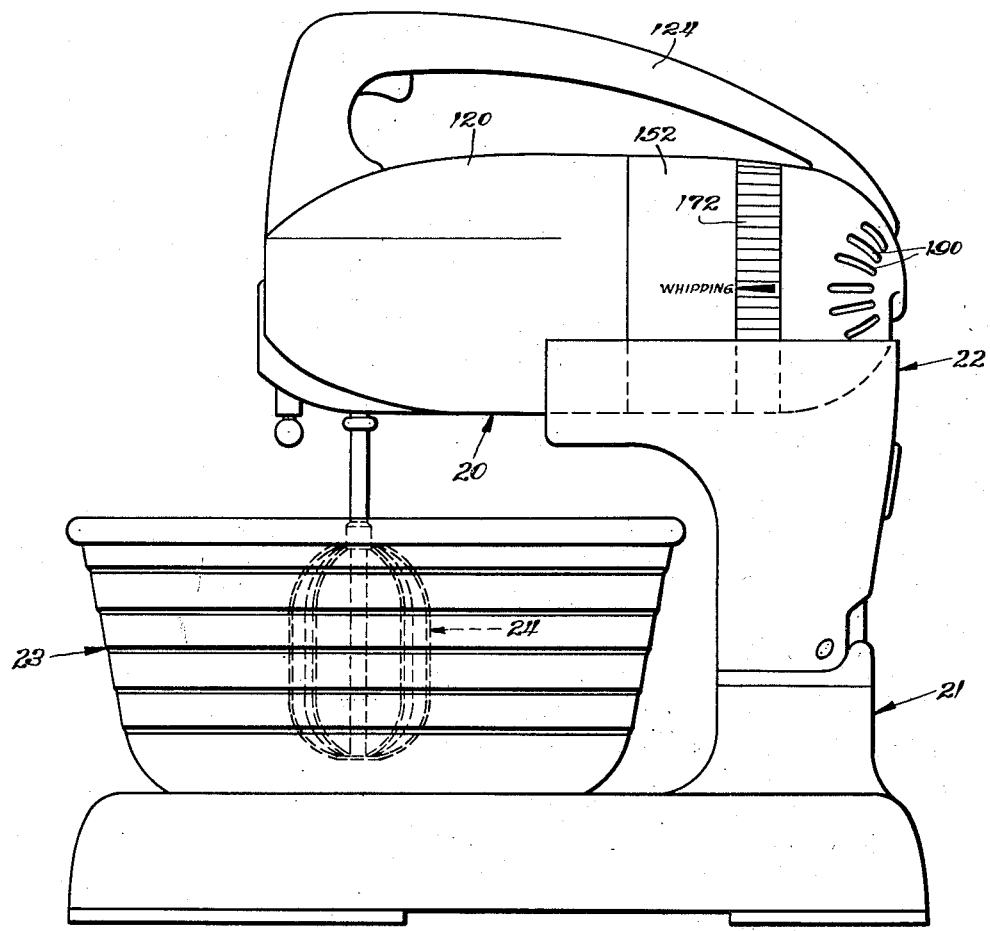
Fig. 1 is a side elevational view of an electric food mixer of the household type, partly in section, embodying the invention.

Referring to Fig. 1, the electric food mixer embodying the invention preferably includes a power unit 20, a base 21, a standard or support construction 22, turntable and bowl construction 23, an agitator 24, and a juicer attachment (not shown).

*Power unit*

Referring now to Figs. 2 and 3, the framework of the power unit 20 comprises a rough inner casing having front and rear sections 102 and 103, respectively, held together by stud bolts 104 and elongated units 105. The front section 102 is bored and reamed concentrically to receive a front armature bearing and a stator 107 of a series wound fractional horsepower electric motor 108.

The rear section 103 carries a rear inboard motor bearing 150. An outer surface 151 of the section 103 is turned down to receive rigidly a decorative plastic band 152 flush with the outer marginal edge of the shell 120 to cover up openings through the side of the rear section 103, which openings are provided for inspection and access when the band is removed.

The bearing 150 is secured within a cylindrical aperture formed in a supporting member 153 which extends radially inward from the inner surface of the rear casing 103. A dielectric plate 155 mounted on a shoulder formed in the member 153 supports electrical components (not shown) of a motor control circuit which is similar to that shown in Behar Patent 2,262,912. Briefly, the rotating part includes a plastic casting having two axially spaced collector rings 161 on its hub, fan blades 162 on its periphery, and centrifugal and adjustable make-and-break contacts 163 on its end face with a lever 164 to determine the speed at which the contacts separate. As shown in the drawings the normally closed contacts of the switch which include contact supporting springs are located to flux outwardly together under the action of centrifugal force when the governor 160 is rotating. However, the outward movement of the inner contact is limited by the lever 164 and its associated linkage so that the outer contact will break contact with the inner one when the centrifugal force is great enough to flex the outer contact farther than the inner contact is permitted to go. The limit thus established for the inner contact is varied at will by varying the adjustment of the lever so that the critical point and thereby the critical speed of the armature at which the centrifugal force operates to separate the contacts of the switch can be varied to maintain the motor at any predetermined speed. An insulating button 169 is carried by the lever 164 for rotation at the axis of armature rotation where it can be actuated with minimum friction by a round headed screw 165 carried on a yoke 166. Axial movement of the screw 165 toward the left as viewed in Fig. 2 rotates the lever 164 in a counterclockwise direction to carry a link 200 (Fig. 4) pivotally secured thereto downwardly to reduce the outward movement of the inner contact 163 whereby the contacts 163 separate at a lower speed than before the adjustment. Clockwise rotation of the lever 164 moves the link 200 vertically upward so that the contacts 163 separate at a higher speed than before the clockwise rotation of the lever 164.

Brushes 167 which contact the collector rings 161 are carried by the insulating plate 168 held in place by bolts 104 secured to the units 105.

Radially around the fan 162 the section 103 has a continuous circular flange 171 which closely approaches the periphery of the blades to provide a shroud or baffle for the fan. On the outer surface of this flange, an adjustment ring 172 is journalled as at 173 for rotation between limits of approximately 90°. On its rear surface the ring 172 is provided with two identical cam surfaces 174 (Fig. 4) molded integrally therewith and the ends 175 (Fig. 3) of the yoke 166 slide on these cam surfaces as the ring 172 is rotated. The ends 175 of the yoke 166 are held against turning by guideways 176 (Figs. 3 and 4) cast in the rear of the ring 172.

A finishing cap 179 rigidly secured to the rear end of the flange 171 by screws 177 carries the rear end of a handle 124 by screw 178 and a central hub member 180 bored as at 181 receives in sliding and centering relationship a head 182 on the yoke 166 so that the two ends 175 and the sliding head 182 provide a three-point suspension for the yoke 166 to move forwardly and rearwardly as the ring 172 is rotated, the yoke 166 being urged to contact the cam surfaces 174 by a compression spring 183 encircling the hub 180 and contacting the yoke 166.

Movement of the yoke 166 is transmitted to the governor lever 164 by a round-headed screw 165 engaging the insulating button 169 and threaded through the yoke head 182 where it receives a lock nut 184. The head 182 is kerfed as at 185 to provide a zeroing adjustment of the governor assembly once a slug is set at the front end of the armature shaft.

Electrical leads 186 are brought into the power unit through an opening 187 at the rear of the cap 179 and are carried forwardly to the electrical components through an opening 188 in the flange 171.

Air for cooling the motor is drawn through openings 190 in the rigid cap 179, as moved by the fan 162, and is exhausted upwardly through openings 121 under the handle 124.

With this arrangement the speed of the motor is infinitely varied by long cams of gradual inclines which divide the frictional load and the take-up spring tension load imposed on the system between them so that the ring is operable by hand smoothly and easily with no danger of it slipping from a set position while the motor is running. Moreover, the ring can be operated from either side of the mixer and also while the power unit is being tilted.

What is claimed is:

1. A speed control for a food mixer comprising a body adapted to be mounted on the end of a shaft for rotation therewith about a predetermined axis and carrying a centrifugally influenced switch and a control for the switch having a movable member located at the axis of rotation, a yoke having a central element engaging said movable member at the axis of rotation, a rotary speed adjustment element having cams thereon engaged at the ends by the arms of the yoke to move the yoke in an axial direction and adjust the movable member when the speed adjustment element is rotated, means for supporting said central element at said axis of rotation, and means for supporting the arms of the yoke against rotation.

2. The combination called for in claim 1 in which said member mounted upon the shaft is provided with fan blades extending outwardly from the periphery thereof, and the last said means supporting the yoke arms against rotation has a body portion closely surrounding said blades to provide a shroud.

3. In a food mixer having a housing and shaft journalled therein whose speed is to be controlled, a speed control comprising a body adapted to be mounted on the end of the shaft for rotation therewith and carrying a centrifugally influenced switch and a control therefor having a movable member located at the axis of rotation of the shaft, a yoke having a central portion engaging said movable member to displace it in an axial direction and having radially disposed arms extending from said central portion, a manually movable member mounted on the housing having cams thereon engaged by the arms of the yoke to shift the yoke in an axial direction when the movable member is moved, means upon said housing for supporting the arms of the yoke against rotation, and means upon the housing supporting the central portion of the yoke at said axis of rotation.

4. The combination called for in claim 3 in which the last said means comprising a boss upon which said central portion slides, said boss having an opening therethrough to the outside of the housing for access to said central portion, and in which said central portion carries an adjustment screw whose inner end engages said switch control.

5. In a food mixer having a housing and a shaft journalled therein whose speed is to be controlled, a speed control comprising a body adapted to be mounted on the end of the shaft for rotation therewith and carrying a centrifugally influenced switch and a control therefor having a movable member located at the axis of rotation of the shaft, resilient means urging said element in one direction axially, a yoke mounted on the housing having a central portion engaging said element to displace it in opposite axial direction, said yoke having diverging arms extending radially from said central portion, manually movable cam means mounted on the housing to engage said yoke arms, means for supporting the central portion of the yoke for movement axially of said axis of rotation, and resilient means for urging said yoke arms into contact with said cam means towards said movable member.

6. In a food mixer having a housing and a shaft journalled therein whose speed is to be controlled, a speed control comprising a body adapted to be mounted on the end of the shaft for rotation therewith and carrying a centrifugally influenced switch and a control therefor having a movable member operable upon the side of the body remote from the main portion of the shaft, resilient means urging said element in one direction axially, a yoke element having a central portion engaging said movable member to displace it in an opposite axial direction, said yoke having diverging arms extending radially from said central portion, a cam element engaged by said yoke arms, one of said elements being mounted on the housing for rotatable movement and the other element being mounted on the housing and supported against rotatable movement, and resilient means for urging said yoke arms into contact with said cam element in a direction towards said movable member.

7. In a food mixer having a housing journalling a shaft, a speed control comprising a body mounted on the end of the shaft for rotation therewith and carrying a centrifugally influenced switch and a control therefor having a movable member located at the axis of rotation of the shaft, a boss on said housing having an opening therethrough coaxial with said shaft, a second member having a central portion slidably mounted in said opening, an element carried by said central portion engaging said movable member and accessible for adjustment with respect to said central portion through said opening, cam means carried by said housing and engaging said second member, and resilient means urging said central portion to maintain contact between said movable member and said element.

WILLIAM F. BISLEY.

REFERENCES CITED

The following references are of record in the file of this patent:

UNITED STATES PATENTS

| Number | Name | Date |
| --- | --- | --- |
| 2,082,264 | Scruggs | June 1, 1937 |
| 2,262,912 | Behar | Nov. 18, 1941 |
| 2,274,480 | Jepson | Feb. 24, 1942 |
| 2,277,095 | Fleischmann | Mar. 24, 1942 |
| 2,406,150 | Kennedy | Aug. 20, 1946 |
| 2,469,043 | Kennedy | May 3, 1949 |
| 2,479,233 | Hass | Aug. 16, 1949 |